(12) United States Patent
Henry et al.

(10) Patent No.: US 7,380,103 B2
(45) Date of Patent: May 27, 2008

(54) APPARATUS AND METHOD FOR SELECTIVE CONTROL OF RESULTS WRITE BACK

(75) Inventors: G. Glenn Henry, Austin, TX (US); Rodney E. Hooker, Austin, TX (US); Terry Parks, Austin, TX (US)

(73) Assignee: iP-First, LLC, Fremont, CA (US)

( * ) Notice: Subject to any disclaimer, the term of this patent is extended or adjusted under 35 U.S.C. 154(b) by 449 days.

(21) Appl. No.: 10/144,589

(22) Filed: May 9, 2002

(65) Prior Publication Data

US 2003/0188129 A1    Oct. 2, 2003

Related U.S. Application Data

(60) Provisional application No. 60/369,688, filed on Apr. 2, 2002.

(51) Int. Cl.
*G06F 9/30*  (2006.01)
*G06F 9/00*  (2006.01)

(52) U.S. Cl. .................... 712/210; 712/218

(58) Field of Classification Search ............. 712/218, 712/209, 212, 226, 210; 711/108, 102, 106
See application file for complete search history.

(56) References Cited

U.S. PATENT DOCUMENTS

| | | | |
|---|---|---|---|
| 3,657,705 A | 4/1972 | Mekota et al. | |
| 4,064,554 A | 12/1977 | Tubbs | |
| 4,217,638 A | 8/1980 | Namimoto et al. | |
| 4,547,849 A | 10/1985 | Louie et al. | |
| 5,029,069 A | 7/1991 | Sakamura | |
| 5,142,679 A | 8/1992 | Owaki et al. | |
| 5,218,712 A | 6/1993 | Cutler et al. | |

(Continued)

FOREIGN PATENT DOCUMENTS

CN    1431584    7/2003

(Continued)

OTHER PUBLICATIONS

U.S. Appl. No. 60/369,586.*

(Continued)

*Primary Examiner*—Alford Kindred
*Assistant Examiner*—Jesse R Moll
(74) *Attorney, Agent, or Firm*—Richard K. Huffman; James W. Huffman

(57) ABSTRACT

A microprocessor apparatus and method are provided, for selectively controlling write back of a result. The apparatus includes translation logic and extended execution logic. The translation logic translates an extended instruction into corresponding micro instructions. The extended instruction has an extended prefix and an extended prefix tag. The extended prefix precludes write back of the result, where the result is that which is produced by executing an operation prescribed by said extended instruction, and wherein the result would otherwise be written back into a destination register. The extended prefix tag indicates the extended prefix, where the extended prefix tag is an otherwise architecturally specified opcode within an instruction set for a microprocessor. The extended execution logic is coupled to the translation logic. The extended execution logic receives the corresponding micro instructions, and executes the operation to generate the result, and precludes write back of the result.

38 Claims, 7 Drawing Sheets

U.S. PATENT DOCUMENTS

| | | |
|---|---|---|
| 5,448,744 A | 9/1995 | Eifert et al. |
| 5,471,595 A | 11/1995 | Yagi et al. |
| 5,481,684 A | 1/1996 | Richter et al. |
| 5,687,338 A | 11/1997 | Boggs et al. |
| 5,751,996 A | 5/1998 | Glew et al. |
| 5,768,574 A | 6/1998 | Dutton et al. |
| 5,778,220 A | 7/1998 | Konigsfeld et al. |
| 5,796,973 A | 8/1998 | Witt et al. |
| 5,822,778 A | 10/1998 | Dutton et al. |
| 5,826,089 A | 10/1998 | Ireton |
| 5,857,103 A | 1/1999 | Grove |
| 5,875,342 A | 2/1999 | Temple |
| 5,913,049 A | 6/1999 | Shiell et al. |
| 5,937,199 A | 8/1999 | Temple |
| 5,991,872 A | 11/1999 | Shiraishi et al. |
| 6,014,735 A | 1/2000 | Chennupaty et al. |
| 6,029,222 A | 2/2000 | Kamiya |
| 6,058,472 A | 5/2000 | Panwar et al. |
| 6,085,312 A | 7/2000 | Abdallah et al. |
| 6,157,996 A * | 12/2000 | Christie et al. ............. 712/218 |
| 6,199,155 B1 * | 3/2001 | Kishida et al. ............. 712/210 |
| 6,230,259 B1 * | 5/2001 | Christie et al. ............. 712/228 |
| 6,317,822 B1 | 11/2001 | Padwekar |
| 6,351,806 B1 | 2/2002 | Wyland |
| 6,434,693 B1 | 8/2002 | Senter et al. |
| 6,456,891 B1 * | 9/2002 | Kranich et al. ................. 700/2 |
| 6,549,999 B2 | 4/2003 | Kishida et al. |
| 6,560,694 B1 | 5/2003 | McGrath et al. |
| 6,581,154 B1 | 6/2003 | Zaidi |
| 6,647,488 B1 | 11/2003 | Takeno et al. |
| 6,823,414 B2 | 11/2004 | Radhakrishna |
| 6,883,053 B2 | 4/2005 | Shinagawa et al. |
| 2001/0013870 A1 | 8/2001 | Pentkovski et al. |
| 2002/0194457 A1 | 12/2002 | Akkary |
| 2003/0159009 A1 | 8/2003 | Henry et al. |
| 2003/0159020 A1 | 8/2003 | Henry et al. |
| 2003/0172252 A1 | 9/2003 | Henry et al. |
| 2003/0188131 A1 | 10/2003 | Henry et al. |
| 2003/0196077 A1 | 10/2003 | Henry et al. |
| 2003/0221091 A1 | 11/2003 | Henry et al. |
| 2005/0102492 A1 | 5/2005 | Henry et al. |
| 2005/0188179 A1 | 8/2005 | Henry et al. |

FOREIGN PATENT DOCUMENTS

| | | |
|---|---|---|
| EP | 0550289 A | 7/1993 |
| EP | 0942359 A | 9/1999 |
| EP | 0947919 A | 10/1999 |
| WO | WO-9722922 A1 | 6/1997 |

OTHER PUBLICATIONS

Paap et al, "Power PC™: A Performance Architecture," COMPCON Spring '93, Digest of Papers, San Francisco, CA, IEEE Computer Society, Feb. 22, 1993, pp. 104-108.

Intel Architecture Software Developer's Manual, vol. 2: Instruction Set Reference, 1999, pp. 2-1 to 2-4, 3-332, 3-353 and B25.

Silberman et al. *An Architectural Framework for Supporting Heterogeneous Instruction-Set Architectures.* Computer, IEEE Computer Society, Long Beach, CA. US vol. 26, No. 6 Jun. 1, 1993. pp. 39-56. ISSN: 0018-0162.

Patterson & Hennessy. "Computer Organization and Design: The Hardware/Software Interface." 1998. Morgan Kaufmann Publishers, Inc. Second Edition. pp. 177-178, 297.

Dobb. "Microprocessor Resources." 2000. http://web.archive.org/web/20000118231610 http://x86.org/secrets/opcodes/icebp.htm.

\* cited by examiner

*Microprocessor Instruction Format*

*8-Bit Opcode Map*

Fig. 3

*Extended Instruction Format*

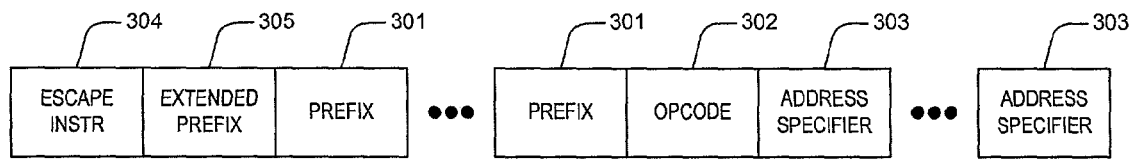

Fig. 4

*8-Bit Extended Prefix Map*

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | E00 | E01 | E02 | E03 | E04 | E05 | E06 | E07 | E08 | E09 | E0A | E0B | E0C | E0D | E0E | E0F |
| 1 | E10 | E11 | E12 | E13 | E14 | E15 | E16 | E17 | E18 | E19 | E1A | E1B | E1C | E1D | E1E | E1F |
| 2 | E20 | E21 | E22 | E23 | E24 | E25 | E26 | E27 | E28 | E29 | E2A | E2B | E2C | E2D | E2E | E2F |
| 3 | E30 | E31 | E32 | E33 | E34 | E35 | E36 | E37 | E38 | E39 | E3A | E3B | E3C | E3D | E3E | E3F |
| 4 | E40 | E41 | E42 | E43 | E44 | E45 | E46 | E47 | E48 | E49 | E4A | E4B | E4C | E4D | E4E | E4F |
| 5 | E50 | E51 | E52 | E53 | E54 | E55 | E56 | E57 | E58 | E59 | E5A | E5B | E5C | E5D | E5E | E5F |
| 6 | E60 | E61 | E62 | E63 | E64 | E65 | E66 | E67 | E68 | E69 | E6A | E6B | E6C | E6D | E6E | E6F |
| 7 | E70 | E71 | E72 | E73 | E74 | E75 | E76 | E77 | E78 | E79 | E7A | E7B | E7C | E7D | E7E | E7F |
| 8 | E80 | E81 | E82 | E83 | E84 | E85 | E86 | E87 | E88 | E89 | E8A | E8B | E8C | E8D | E8E | E8F |
| 9 | E90 | E91 | E92 | E93 | E94 | E95 | E96 | E97 | E98 | E99 | E9A | E9B | E9C | E9D | E9E | E9F |
| A | EA0 | EA1 | EA2 | EA3 | EA4 | EA5 | EA6 | EA7 | EA8 | EA9 | EAA | EAB | EAC | EAD | EAE | EAF |
| B | EB0 | EB1 | EB2 | EB3 | EB4 | EB5 | EB6 | EB7 | EB8 | EB9 | EBA | EBB | EBC | EBD | EBE | EBF |
| C | EC0 | EC1 | EC2 | EC3 | EC4 | EC5 | EC6 | EC7 | EC8 | EC9 | ECA | ECB | ECC | ECD | ECE | ECF |
| D | ED0 | ED1 | ED2 | ED3 | ED4 | ED5 | ED6 | ED7 | ED8 | ED9 | EDA | EDB | EDC | EDD | EDE | EDF |
| E | EE0 | EE1 | EE2 | EE3 | EE4 | EE5 | EE6 | EE7 | EE8 | EE9 | EEA | EEB | EEC | EED | EEE | EEF |
| F | EF0 | EF1 | EF2 | EF3 | EF4 | EF5 | EF6 | EF7 | EF8 | EF9 | EFA | EFB | EFC | EFD | EFE | EFF |

*Microprocessor for Selective Write Back of Results*

Fig. 6

*Extended Prefix for Global Results Write Back Control*

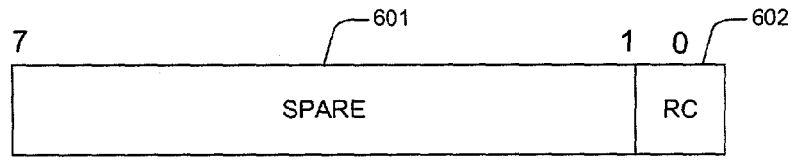

Fig. 7

*Extended Prefix for Selective Results Write Back Control*

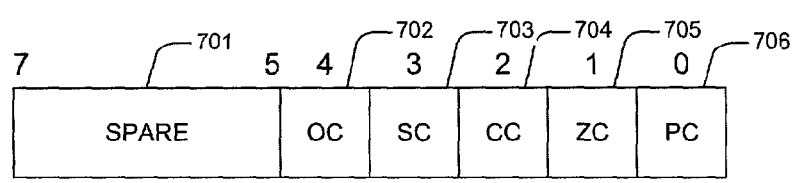

Fig. 8

*Extended Prefix for Conditional Results Write Back Control*

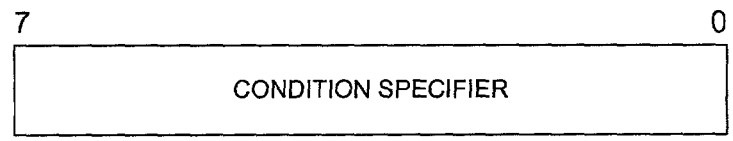

Fig. 9

*Condition Specifier Logic States*

| STATE | CONDITION |
|---|---|
| 0000 | OVERFLOW |
| 0001 | NOT OVERFLOW |
| 0010 | CARRY |
| 0011 | NOT CARRY |
| 0100 | ZERO |
| 0101 | NOT ZERO |
| 0110 | NOT ABOVE |
| 0111 | NOT BELOW OR EQUAL |
| 1000 | SIGN |
| 1001 | NOT SIGN |
| 1010 | PARITY EVEN |
| 1011 | PARITY ODD |
| 1100 | NOT GREATER OR EQUAL |
| 1101 | GREATER OR EQUAL |
| 1110 | NOT GREATER |
| 1111 | GREATER |

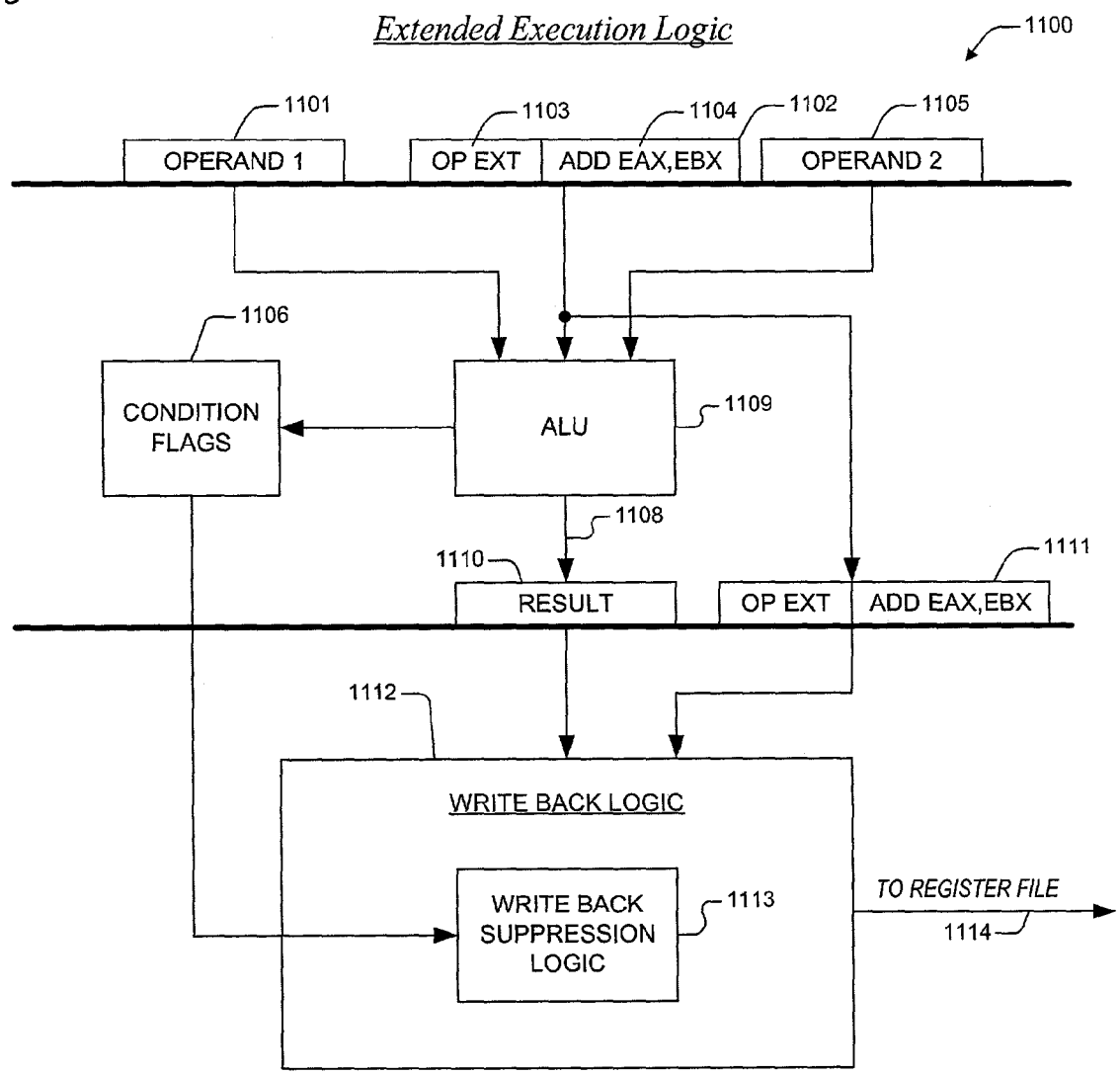

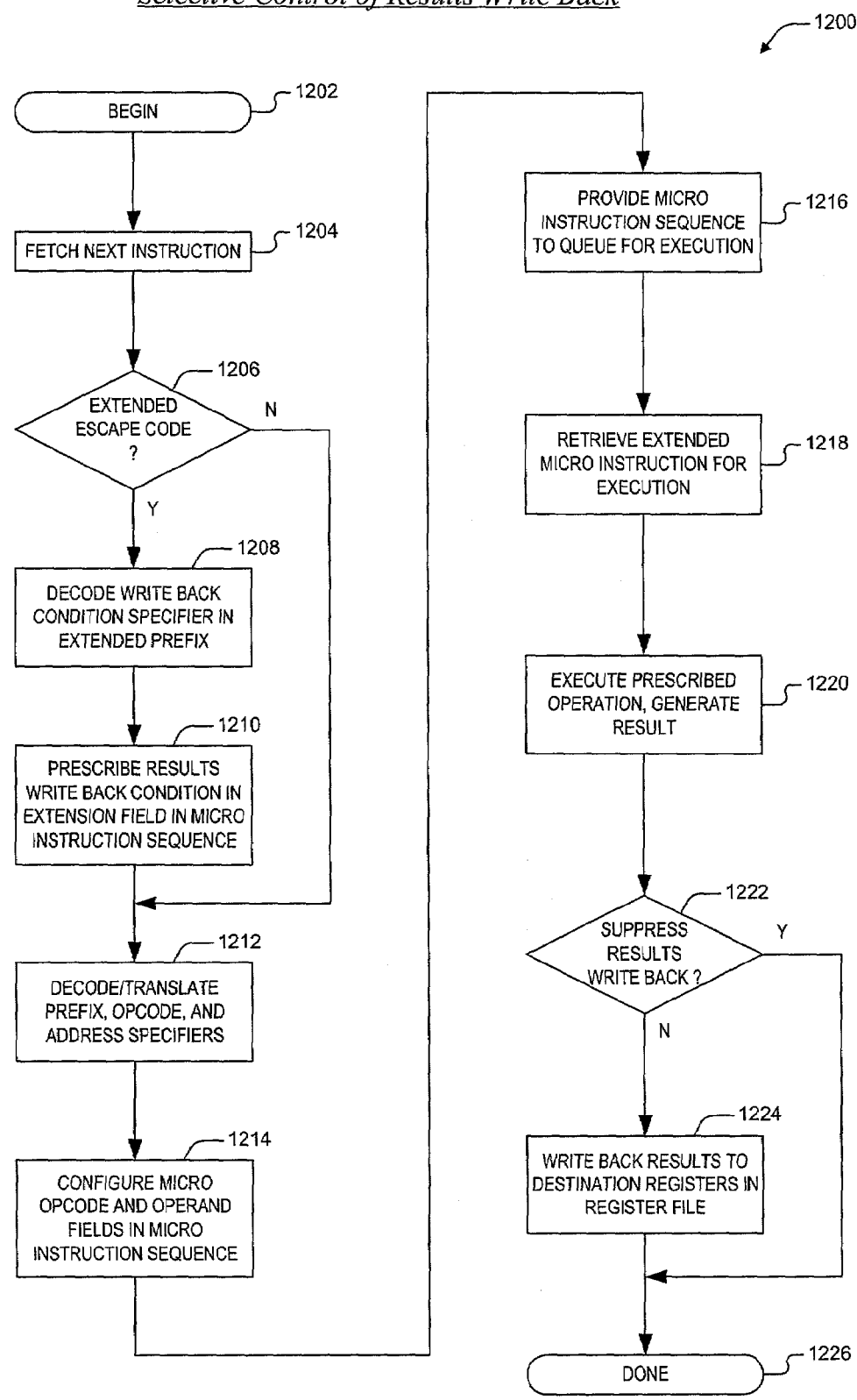

APPARATUS AND METHOD FOR SELECTIVE CONTROL OF RESULTS WRITE BACK

CROSS-REFERENCE TO RELATED APPLICATIONS

This application claims priority based on U.S. Provisional Application, Ser. No. 60/369,688, filed Apr. 2, 2002, entitled "APPARATUS AND METHOD FOR SELECTIVE CONTROL OF RESULTS WRITE BACK."

CROSS-REFERENCE TO RELATED APPLICATIONS

This application is related to the following co-pending U.S. Patent Applications, which are filed on the same day as this application, and which have a common assignee and common inventors.

| SERIAL NUMBER | DOCKET NUMBER | TITLE |
| --- | --- | --- |
| 10/144595 | CNTR.2176 | APPARATUS AND METHOD FOR EXTENDING A MICROPROCESSOR INSTRUCTION SET |
| 10/144592 | CNTR.2186 | APPARATUS AND METHOD FOR CONDITIONAL INSTRUCTION EXECUTION |
| 10/144593 | CNTR.2188 | APPARATUS AND METHOD FOR SELECTIVE CONTROL OF CONDITION CODE WRITE BACK |
| 10/144590 | CNTR.2189 | MECHANISM FOR EXTENDING THE NUMBER OF REGISTERS IN A MICROPROCESSOR |

BACKGROUND OF THE INVENTION

1. Field of the Invention

This invention relates in general to the field of microelectronics, and more particularly to a technique for incorporating selective results write back control features into an existing microprocessor instruction set architecture.

2. Description of the Related Art

Since microprocessors were fielded in the early 1970's, their use has grown exponentially. Originally employed in the scientific and technical fields, microprocessor use has gravitated from those specialty fields into commercial consumer fields that include products such as desktop and laptop computers, video game controllers, and a host of other common household and business devices.

Along with this explosive growth in use over the past 30 years, the art has experienced a corresponding technology pull that is characterized by an escalating demand for increased speed, expanded addressing capabilities, faster memory accesses, larger operand size, more operations (e.g., floating point, single-instruction multiple data (SIMD), conditional moves, etc.), and added specialty operations (e.g., multi-media operations). This technology pull has resulted in an incredible number of advances in the art which have been incorporated in microprocessor designs such as extensive pipelining, super-scalar architectures, cache structures, out-of-order processing, burst access, branch predication, and speculative execution. Quite frankly, a present day microprocessor is an amazingly complex and capable machine in comparison to its 30-year-old predecessors.

But unlike many other products, there is another very important factor that has constrained, and continues to constrain, the evolution of microprocessor architecture. This factor, legacy compatibility, moreover accounts for a great deal of complexity in a present day microprocessor. For market-driven reasons, many producers have opted to incorporate new architectural features into updated microprocessor designs, but at the same time in these newer products they choose to retain all of the capabilities that are required to insure compatibility with older, so-called legacy application programs.

Nowhere has this legacy compatibility burden been more noticeable than can be seen in the development history of x86-compatible microprocessors. It is well known that a present day virtual-mode, 32-/16-bit x86 microprocessor is still capable of executing 8-bit, real-mode, application programs which were produced during the 1980's. And those skilled in the art will also acknowledge that a significant amount of corresponding architectural "baggage" is carried along in the x86 architecture for the sole purpose of supporting compatibility with legacy applications and operating modes. Yet, while in the past developers have been able to incorporate newly developed architectural features into existing instruction set architectures, the means whereby use of these features is enabled—programmable instructions—are becoming scarce. More succinctly, there are no more "spare" instructions in certain instruction sets of interest that provide designers with a means to incorporate newer features into an existing architecture.

In the x86 instruction set architecture, for example, there are no undefined 1-byte opcode states that have not already been used. All 256 opcode states in the primary 1-byte x86 opcode map are taken up with existing instructions. As a result, x86 microprocessor designers must presently make a choice between providing new features and abandoning legacy compatibility. If new programmable features are to be provided, then they must be assigned to opcode states. And if spare opcode states do not remain in an existing instruction set architecture, then some of the existing opcode states must be redefined to provide for the new features. Thus, legacy compatibility is sacrificed in order to provide for new feature growth.

One area of growth that is yet to be addressed in many instruction set architectures is known as selective control of results write back. Many present day application programs exhibit complex signal and data processing algorithms that exercise multiple iterative operations on a single operand in order to produce a meaningful result. In addition, it is often expected that the result will exhibit certain boundary properties, or corner properties, such as being a positive number, a negative number, generating a carry bit, or having an even number of logical ones. Furthermore, as one skilled in the art will appreciate, when execution logic in a present day microprocessor generates a result, the execution logic simultaneously updates a series of condition code bits that are stored in a special register (e.g. a result condition flags register) that indicate the corner properties of the result as described above. Hence, when an operation is executed and a corresponding result is generated, condition code logic in a microprocessor evaluates the corresponding result in view of each of the boundary conditions and sets corresponding bits in the condition codes register for subsequent query by conditional branch instructions. Generally speaking, the flow of application programs frequently is determined based upon whether a result reflects certain boundary conditions as indicated by the state of the condition codes bits.

But what often happens is that the condition bits of a result are checked following an iteration of a program loop to determine if a result has crossed a boundary (e.g., zero, overflow, etc.) or if the result yet remains within a region that is demarcated by the boundary. However, when a following instruction in a program loop examines a condition codes register to determine whether or not the result has crossed the boundary into another region, irreversible damage to the result may have already occurred. One skilled in the art will appreciate that when an operation is performed on an operand, execution logic in the microprocessor generates the result, it evaluates the boundary conditions and updates the condition codes register, and the result is written back into an architectural register specified as a destination for the result. In the case of iterative program loops, the result that is written back into the destination register typically overwrites a result computed during the previous iteration of the program loop. When this occurs, although a programmer is able to subsequently discern that a recently iterated result has crossed a certain boundary, if the boundary defines a region in which the recently iterated result becomes no longer usable, then all previous iterations of the program loop have been wasted.

Therefore, what is needed is a technique that allows a programmer to selectively control the write back of a result that is based upon the state of condition codes corresponding to the result, where the technique is to be provided within an existing microprocessor instruction set architecture, and where the microprocessor instruction set is completely populated with defined opcodes, and where incorporation of the technique allows a conforming microprocessor to retain the capability to execute legacy application programs.

SUMMARY OF THE INVENTION

The present invention, among other applications, is directed to overcoming these and other problems and disadvantages of the prior art. The present invention provides a superior technique for extending a microprocessor instruction set beyond its current capabilities to provide for programmable control of results write back. In one embodiment, a microprocessor apparatus is provided, for selectively controlling write back of a result. The apparatus includes translation logic and extended execution logic. The translation logic translates an extended instruction into corresponding micro instructions. The extended instruction has an extended prefix and an extended prefix tag. The extended prefix precludes write back of the result, where the result is that which is produced by executing an operation prescribed by said extended instruction, and wherein the result would otherwise be written back into a destination register. The extended prefix tag indicates the extended prefix, where the extended prefix tag is an otherwise architecturally specified opcode within an instruction set for a microprocessor. The extended execution logic is coupled to the translation logic.

The extended execution logic receives the corresponding micro instructions, and executes the operation to generate the result, and precludes write back of the result.

One aspect of the present invention contemplates an extension mechanism, for adding result write back control features to an existing microprocessor instruction set. The extension mechanism includes an extended instruction and a translator. The extended instruction directs a microprocessor to execute an operation, to generate a result of said operation, and to suppress write back of the result to a destination register, where the extended instruction includes a selected opcode in the existing microprocessor instruction set followed by an n-bit extended prefix. The selected opcode indicates the extended instruction and the n-bit extended prefix indicates a condition under which write back is to be suppressed. The translator receives the extended instruction, and generates a micro instruction sequence directing the microprocessor to execute the operation, to generate the result, and directs a write back control logic to preclude write back of the result to the destination register if said condition is satisfied.

Another aspect of the present invention comprehends an instruction set extension apparatus, for providing programmable result write back capabilities to an existing microprocessor instruction set. The instruction set extension apparatus has an escape tag, a write back specifier, and a write back controller. The escape tag is received by a translation logic, and indicates that accompanying parts of a corresponding instruction prescribe an extended operation to be performed by a microprocessor to generate a result that would otherwise be written back to a destination register, where the escape tag is a first opcode entity within the existing microprocessor instruction set. The write back specifier is coupled to the escape tag and is one of the accompanying parts. The write back specifier prescribes a condition associated with the result of the extended operation. The write back controller is coupled to the translation logic. The write back controller evaluates the condition, and, if the condition is true, disables write back of the result to the destination register.

A further aspect of the present invention provides a method for extending a microprocessor instruction set to provide for programmable write back of a result of a prescribed operation. The method includes providing an extended instruction, the extended instruction including an extended tag along with an extended prefix, where the extended tag is a first opcode in the microprocessor instruction set; prescribing, via the extended prefix and remaining parts of the extended instruction, the prescribed operation to be executed, where the result is otherwise written back into a destination register, and where the prescribing directs that write back of the result be inhibited; and executing the prescribed operation, generating the result, and inhibiting write back of the result into the destination register.

BRIEF DESCRIPTION OF THE DRAWINGS

These and other objects, features, and advantages of the present invention will become better understood with regard to the following description, and accompanying drawings where:

FIG. 3 is a block diagram featuring an extended instruction format according to the present invention;

FIG. 4 is a table showing how extended architectural features are mapped to logic states of bits in an 8-bit extended prefix embodiment according to the present invention;

FIG. 6 is a block diagram featuring one embodiment of an extended prefix for selective control of results write back according to the present invention;

FIG. 7 is a block diagram depicting an alternative embodiment of an extended prefix for selective control of results write back according to the present invention;

FIG. 8 is a block diagram showing another embodiment of an extended prefix for selective control of results write back according to the present invention;

FIG. 9 is a table illustrating how states of the condition specifier field of FIG. 8 can be mapped to conditions under which a result is precluded from write back;

FIG. 11 is a block diagram illustrating extended execution logic within the microprocessor of FIG. 5; and FIG. 12 is a flow chart depicting a method for translating and executing instructions according to the present invention that provide for selective control of write back for results.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles discussed herein may be applied to other embodiments. Therefore, the present invention is not intended to be limited to the particular embodiments shown and described herein, but is to be accorded the widest scope consistent with the principles and novel features herein disclosed.

Figure 1:
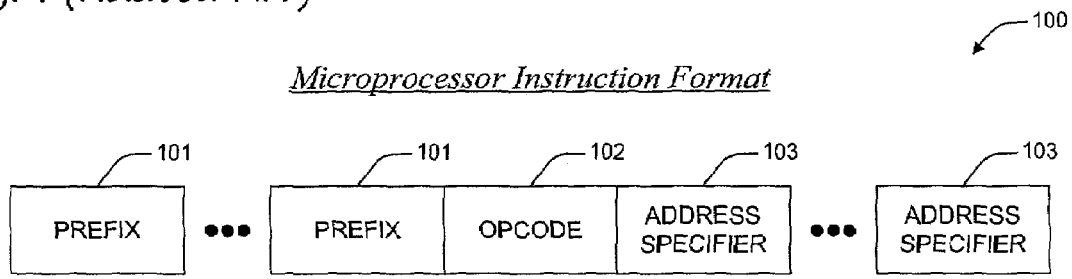
FIG. 1 is a block diagram illustrating a related art microprocessor instruction format.
Figure 2:
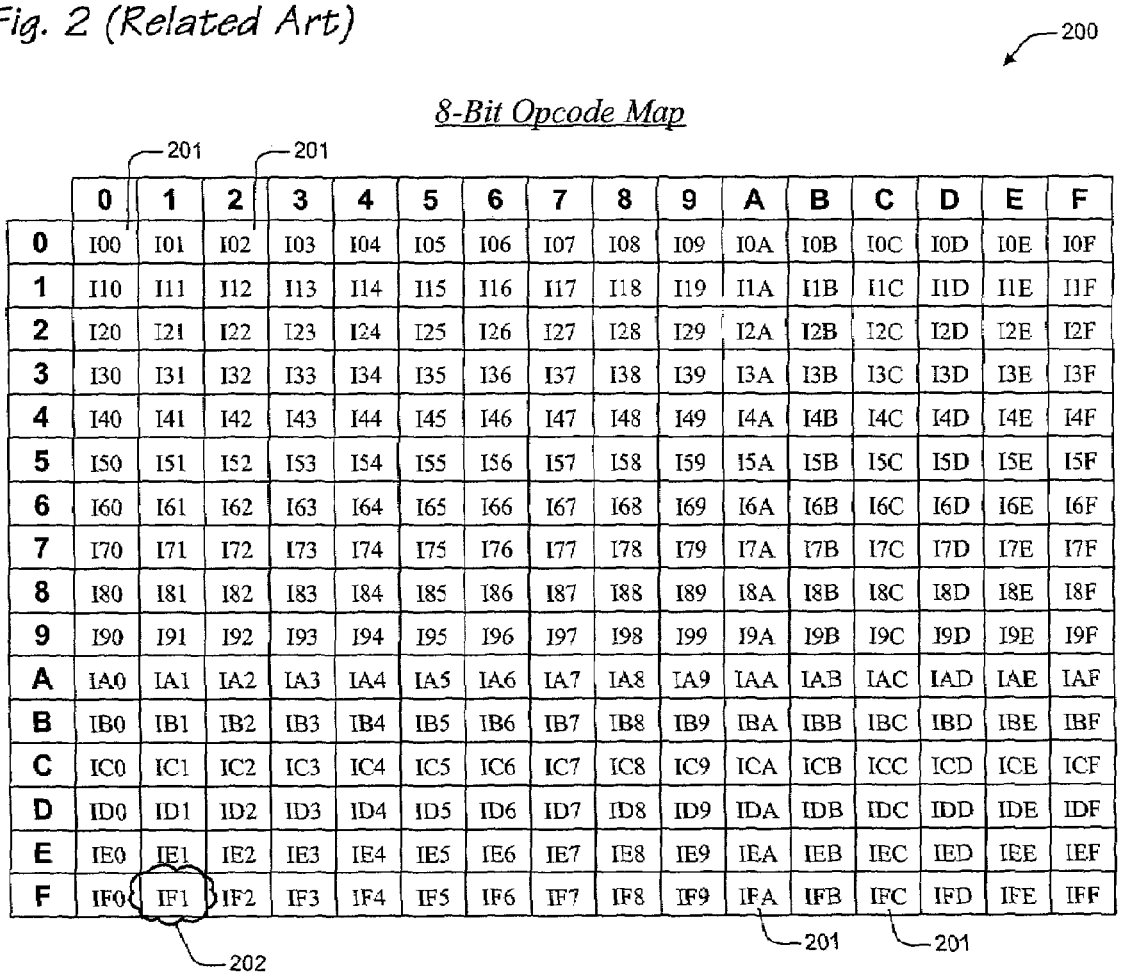
FIG. 2 is a table depicting how instructions in a instruction set architecture are mapped to logic states of bits in an 8-bit opcode byte within the instruction format of FIG. 1.

In view of the above background discussion on the techniques employed within present day microprocessors to extend the architectural features of those microprocessors beyond the capabilities of their associated instruction sets, a related art example will now be discussed with reference to FIGS. 1-2. The discussion highlights the problems that microprocessor designers routinely face today. On the one hand, they desire to incorporate more recently developed architectural features into a microprocessor design and, on the other hand, market conditions dictate that they must retain the capability to execute legacy application programs. In the example of FIGS. 1-2, a completely defined opcode map rules out the possibility of defining new opcodes for the exemplary architecture. Thus, the designers are compelled to choose either to incorporate the new features and sacrifice legacy compatibility to some extent, or to forego more recent architectural advances altogether in favor of maintaining the ability to execute older application programs. Following the related art discussion, a discussion of the present invention will be provided with reference to FIGS. 3-12. By employing an existing, yet obsolete, opcode as a prefix tag for an extended instruction that follows, the present invention enables microprocessor designers to overcome the limitations of completely full instruction set architectures, thereby allowing them to provide programmable results write back control capabilities while concurrently retaining all of the instructions and related features that are required to run legacy application programs.

Turning to FIG. 1, a block diagram is presented illustrating a related art microprocessor instruction format 100. The related art instruction 100 has a variable number of instruction entities 101-103, each set to a specified value, that together make up a specific instruction 100 for a microprocessor. The specific instruction 100 directs the microprocessor to perform a specific operation such as adding two operands together, or moving an operand from memory to an internal register. Typically, an opcode entity 102 within the instruction 100 prescribes the specific operation to be performed, and optional address specifier entities 103 follow the opcode 101 prescribing additional information about the specific operation such as how the operation is to be performed, where the operands are located, etc. The instruction format 100 additionally allows a programmer to precede an opcode 102 with prefix entities 101. The prefixes 101 direct the application of specified architectural features during the execution of the specific operation prescribed by the opcode 102. Typically, these architectural features can be applied to most of the operations prescribed by any of the opcodes 102 in the instruction set. For example, prefixes 101 in some present day microprocessors direct operations to be executed using different operand sizes (e.g., 8-bit, 16-bit, 32-bit). Accordingly, these processors are programmed to a default operand size (say, 32-bit), and prefixes 101 are provided in their respective instruction sets enabling programmers to selectively override the default operand size (say, to perform 16-bit operations) on an instruction-by-instruction basis. Selectable operand size is merely one example of an architectural feature that spans a significant number of the operations (e.g., add, subtract, multiply, Boolean logic, etc.) prescribed by opcodes 102 within many present day microprocessors.

One familiar instance of the instruction format 100 shown in FIG. 1 is the x86 instruction format 100, which is employed by all present day x86-compatible microprocessors. More specifically, the x86 instruction format 100 (also known as the x86 instruction set architecture 100) uses 8-bit prefixes 101, 8-bit opcodes 102, and 8-bit address specifiers 103. The x86 architecture 100 has several prefixes 101 as well, two of which override default address/data sizes of an x86 microprocessor (i.e., opcode states 66H and 67H), another which directs the microprocessor to interpret a following opcode byte 102 according to alternative translation rules (i.e., prefix value 0FH, which causes translation to be performed according to the so-called 2-byte opcode rules), and other prefixes 101 which cause associated operations to be repeated until repetition criteria are satisfied (i.e., the REP opcodes: F0H, F2H, and F3H).

Referring now to FIG. 2, a table 200 is presented depicting how instructions 201 in an instruction set architecture are mapped to logic states of bits in an 8-bit opcode byte 102 within the instruction format of FIG. 1. The table 200 presents an exemplary 8-bit opcode map 200 that associates up to 256 values of an 8-bit opcode entity 102 with corresponding microprocessor opcode instructions 201. The table 200 maps a particular value of an opcode entity 102, say value 02H, to a corresponding instruction opcode 201 (i.e., instruction I02 201). In the particular case of the x86 opcode map, it is well known in the art that opcode value 14H is mapped to the x86 Add With Carry (ADC) instruction opcode, which directs that an 8-bit immediate operand be added to the contents of architectural register AL. One skilled in the art will also appreciate that the x86 prefixes 101 alluded to above (i.e., 66H, 67H, 0FH, F0H, F2H, and F3H) are actually opcode values 201 that contextually specify the application of certain architectural extensions to the operation prescribed by a following opcode entity 102. For example, preceding opcode 14H (normally, the ADC opcode discussed above) with prefix 0FH results in an x86 processor executing an Unpack and Interleave Low Packed Single-Precision Floating-Point Values (UNPCKLPS) operation instead of the Add With Carry (ADC). This is because alternative translation rules are applied when an x86 processor encounters prefix 0FH. Features such as described in this x86 example are enabled in part in a present day microprocessor because instruction translation/decoding logic in the microprocessor interprets the entities 101-103 of an instruction 100 in order. Hence, the use of specific opcode values as prefixes 101 in instruction set architectures has, in past times, allowed microprocessor designers to incorporate a significant number of advanced architectural features into a complying microprocessor design without disadvantageously impacting the execution of older programs that do not employ those specific opcode states. For example, a legacy program which never employs x86 opcode 0FH will still run on a present day x86 microprocessor. And a newer application program, by using x86 opcode 0FH as a prefix 101, can benefit from a substantial number of x86 architectural features that have been more recently incorporated into the architecture to include single instruction multiple data (SIMD) operations and conditional move operations.

The incorporation of architectural feature advances has been accomplished in the past through the designation of available/spare opcode values 201 as prefixes 101 (also known as architectural feature tags/indicators 101 or escape instructions 101). Yet, many instruction set architectures 100 have exhausted their instruction set resources in terms of providing enhancements because of a very straightforward reason: all of the available/spare opcode states have been used up. That is, all of the opcode values in the opcode map 200 have been architecturally specified. And when all of the available opcode values have been assigned as either opcode entities 102 or prefix entities 101, then there are no more opcode values remaining to provide for the incorporation of new features. This significant problem exists in many microprocessor architectures today and consequently forces designers to choose between adding architectural features to a design and retaining compatibility with older programs.

The instructions 201 shown in FIG. 2 are depicted generically (i.e., I24, I86) rather than specifically (i.e., Add With Carry, Subtract, Exclusive-OR). This is because fully occupied opcode maps 200 are presently precluding the incorporation of more recent architectural advances in a number of different microprocessor architectures. And although an 8-bit opcode entity 102 is alluded to in the example of FIG. 2, one skilled in the art will appreciate that the specific size of the opcode 102 is irrelevant in any sense other than its use as a specific case to teach the problem of a full opcode structure 200. Accordingly, a fully populated 6-bit opcode map would exhibit 64 architecturally defined opcodes/prefixes 201 and would likewise provide no available/spare opcode values for expansion.

One fallback alternative to completely annihilating an existing instruction set and replacing it with a new format 100 and opcode map 200 is to substitute new instruction meanings for only a subset of existing opcodes 201, for instance opcodes 40H through 4FH in FIG. 2. Under this fallback technique, a conforming microprocessor operates exclusively in one of two operating modes: a legacy-compatible mode, where opcodes 40H-4FH are interpreted according to legacy rules, or an enhanced mode, where opcodes 40H-4FH are interpreted according to enhanced architectural rules. This technique indeed enables designers to incorporate new features into a design, yet when the conforming microprocessor is running in an enhanced mode it excludes execution of any application program that uses opcodes 40H-4FH. Hence, from the standpoint of retaining legacy compatibility, the fallback legacy-compatible/enhanced mode technique is not necessarily favorable.

The present inventors, however, have observed the use frequency of certain opcodes 201 in instruction sets 200 having fully-populated opcode spaces over the breadth of application programs composed for execution on compliant microprocessors. They have consequently noted that there are some opcodes 202 which, although they are architecturally defined, are not employed within application programs that are capable of being executed by the microprocessors. Instruction IF1 202 is depicted in FIG. 2 as such an example of this singularity. In fact, the very same opcode value 202 (i.e., F1H) maps to a valid instruction 202 in the x86 instruction set architecture that is not presently employed by any extant application program. While the unused x86 instruction 202 is a valid x86 instruction 202 that directs an architecturally specified operation on an x86 microprocessor, it is not employed in any existing application program that can be executed on any present day x86 microprocessor. The particular x86 instruction 202 is known as In Circuit Emulation Breakpoint (i.e., ICE BKPT, opcode value F1H), and was formerly employed exclusively in a class of microprocessor emulation equipment that no longer exists today. ICE BKPT 202 was never employed in an application program outside of an in-circuit emulator, and the form of in-circuit emulation equipment that formerly employed ICE BKPT 202 is obsolete. Hence, in the x86 case, the present inventors have identified a means within a completely occupied instruction set architecture 200 whereby they can exploit a valid, yet obsolete, opcode 202 to allow for the incorporation of advanced architectural features in a microprocessor design without sacrificing legacy compatibility. In a fully-occupied instruction set architecture 200, the present invention employs an architecturally specified, yet unemployed, opcode 202 as a indicator tag for in an n-bit prefix that follows, thus allowing microprocessor designers to incorporate up to $2^n$ more recently developed architectural features into an existing microprocessor design, while concurrently retaining complete compatibility with all legacy software.

The present invention exploits the prefix tag/extended prefix concept by providing an n-bit results write back conditions specifier prefix whereby programmers are allowed to prescribe a conventional operation for execution by a microprocessor (e.g., addition, subtraction, Boolean operation, operand manipulation, etc.) and, within the same instruction, enable/disable the write back (i.e., update) of a result generated by execution of the conventional operation. Alternative embodiments are discussed herein that enable programmer to preclude write back of the result under all conditions and to also prescribe a condition under which write back is inhibited, such as if the result caused a carry bit to be generated. specified condition codes associated with the result generated by execution of the conventional operation. The present invention will now be further discussed with reference to FIGS. 3-12.

Turning to FIG. 3, a block diagram is presented featuring an extended instruction format 300 according to the present invention. Very much like the format 100 discussed with reference to FIG. 1, the extended instruction format 300 has a variable number of instruction entities 301-305, each set to a specified value, that together make up a specific instruction 300 for a microprocessor. The specific instruction 300 directs the microprocessor to perform a specific operation such as adding two operands together, or moving an operand from memory to a register within the microprocessor. Typically, an opcode entity 302 in the instruction 300 prescribes the specific operation to be performed, and optional address specifier entities 303 follow the opcode 302 prescribing additional information about the specific operation such as how the operation is to be performed, where the operands are located, etc. The instruction format 300 also allows a programmer to prefix an opcode 302 with prefix entities 301 that direct the application of existing architectural features during the execution of the specific operation prescribed by the opcode 302.

The extended instruction 300 according to the present invention, however, is a superset of the instruction format 100 described above with reference to FIG. 1, having two additional entities 304, 305 which are optionally provided as an instruction extension to precede all remaining entities 301-303 in a formatted extended instruction 300. The purpose of the two additional entities 304, 305 is to enable/disable write back of a generated result under a specified condition. The specified condition is prescribed as a subset of a plurality of condition codes associated with the result of a specified operation. The two additional entities 304, 305 provide for the incorporation of selective results write back features which would otherwise be not specifiable within a fully populated instruction set architecture. The optional entities 304, 305 are an extended instruction tag 304 and an extended write back specifier prefix 305. The extended instruction tag 305 is an otherwise architecturally specified opcode within a microprocessor instruction set. In an x86 embodiment, the extended instruction tag 304, or escape tag 304, is opcode state F1H, the formerly used ICE BKPT instruction. The escape tag 304 indicates to microprocessor logic that the write back specifier prefix 305, or extended features specifier 305, follows, where the write back specifier 305 prescribes a condition corresponding to a result of a prescribed operation under which write back of the result is to be precluded. In one embodiment, the escape tag 304 indicates that accompanying parts 301-303, 305 of a corresponding extended instruction 300 prescribe an extended operation to be performed by the microprocessor. The n-bit extended prefix 305, or write back specifier 305, indicates a condition under which write back of the result is to be suppressed. Following generation of the result, if the condition is satisfied, write back control logic in the microprocessor disables write back of the result.

To summarize the conditional execution extension technique according to the present invention, an instruction extension is configured from one of the opcodes/instructions 304 in an existing instruction set architecture and an extended prefix 305. The selected opcode instruction serves as an indicator 304 that the instruction 300 is an extended features instruction 300 (that is, it prescribes extensions to the microprocessor architecture), and the extended prefix 305 prescribes a condition associated with a result of a specified operation, whose update is precluded upon generation of the result, if the condition is true. In one embodiment, the extended prefix 305 is 8-bits in size, providing for the specification of up to 256 different combinations of condition codes. An n-bit prefix embodiment provides for the specification of up to $2^n$ different condition code combinations.

Now turning to FIG. 4, a table 400 is presented showing how condition codes update control extensions are mapped to logic states of bits in an 8-bit extended prefix embodiment according to the present invention. Similar to the opcode map 200 discussed with reference to FIG. 2, the table 400 of FIG. 4 presents an exemplary 8-bit write back specifier prefix map 400 that associates up to 256 values of an 8-bit extended prefix entity 305 with corresponding conditions 401 (e.g., E34, E4D, etc.) for precluding write back of a result. In the case of an x86 embodiment, the 8-bit extended feature prefix 305 according to the present invention serves to provide for specifiers 401 (i.e., E00-EFF) which are not otherwise provided for by the current x86 instruction set architecture.

The extended features 401 shown in FIG. 4 are depicted generically rather than specifically because the technique according to the present invention is applicable to a variety of different architectural extensions 401 and specific instruction set architectures. One skilled in the art will appreciate that many different architectural features 401, including those noted above, can be incorporated into an existing instruction set according to the escape tag 304/extended prefix 305 technique described herein. The 8-bit prefix embodiment of FIG. 4 provides for up to 256 different features 401, however, an n-bit prefix embodiment can allow for programming of up to $2^n$ different features 401.

In embodiments that correspond to the types of condition code storage and representation means common to many present day microprocessors, condition combinations can be specified for result write back inhibition that include boundary attributes of a result such as result zero, result not zero, result having even parity, result having odd parity, result sign bit set, result sign bit not set, result overflow, result not overflow, carry bit set, and carry bit not set. In many of these microprocessors, a condition code status entity (i.e., a register) is configured with a plurality of condition code bits (or flags), each of which represents whether or not a recently generated result has crossed some result boundary condition such as generating a carry bit, or having a sign bit indicating that the result is a negative number. The specific condition codes described above, however, are not provided to limit the scope of the present invention to one particular set of result condition codes. The above embodiments are provided, rather, as examples of how a condition codes specifier prefix 305 is encoded according to the present invention to preclude write back of a result under a satisfied condition reflected by the state of certain condition codes. One skilled in the art will appreciate that configuration of a particular write back specifier prefix 305 is based upon how corresponding condition codes are represented and stored in a corresponding microprocessor.

Figure 5:
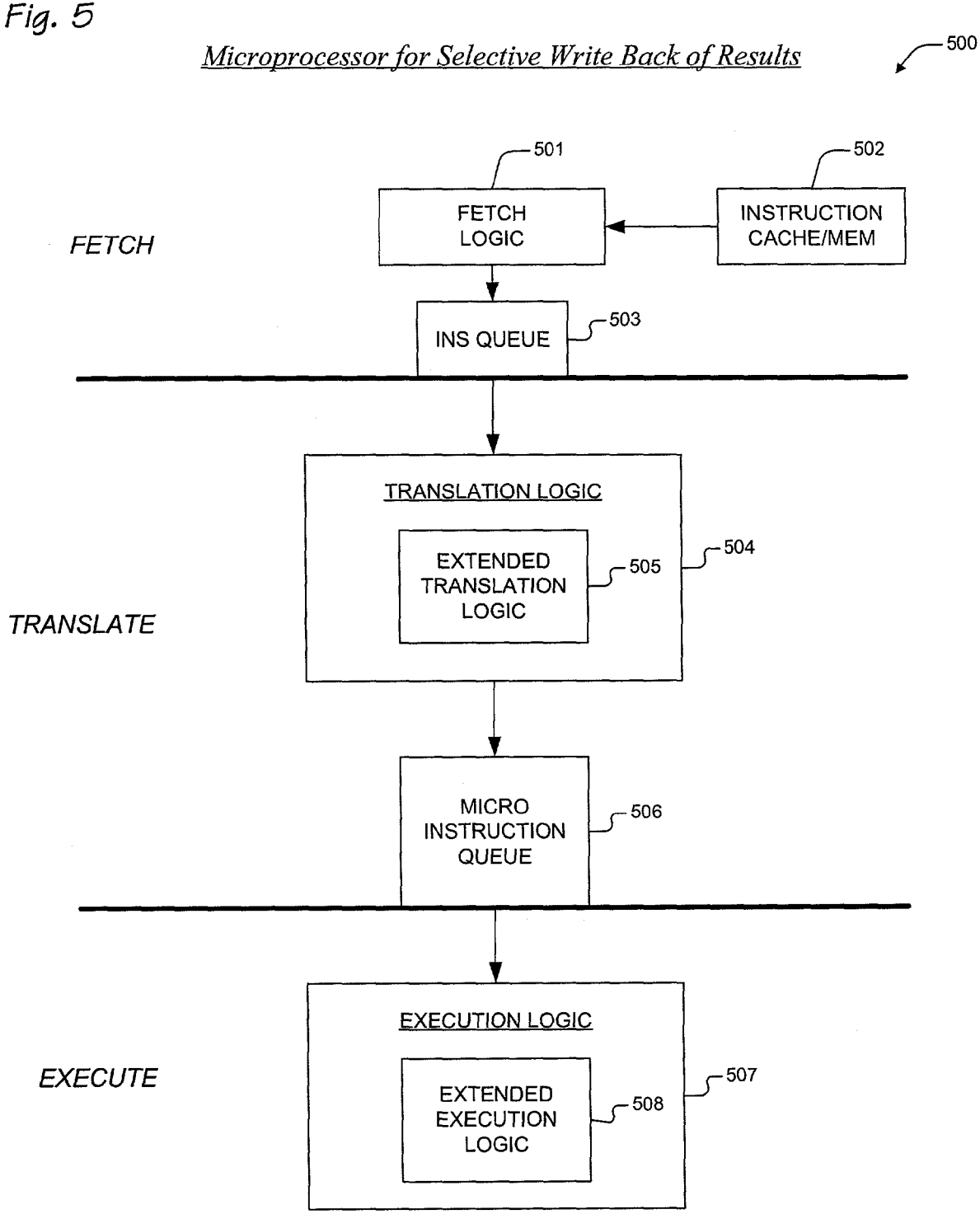
FIG. 5 is a block diagram illustrating a pipeline microprocessor for selectively writing back the results of operations executed according to the present invention.

Now referring to FIG. 5, a block diagram is presented illustrating a pipeline microprocessor 500 according to the present invention for controlling the write back of the results of operations under specified conditions. The microprocessor 500 has three notable stage categories: fetch, translate, and execute. The fetch stage has fetch logic 501 that retrieves instructions from an instruction cache 502 or external memory 502. The retrieved instructions are provided to the translate stage via an instruction queue 503. The translate stage has translation logic 504 that is coupled to a micro instruction queue 506. The translation logic 504 includes extended translation logic 505. The execute stage has execution logic 507 having extended execution logic 508 therein.

In operation, the fetch logic 501 retrieves instructions formatted according to the present invention from the instruction cache/external memory 502, and places these instructions in the instruction queue 503 in execution order. The instructions are retrieved from the instruction queue 503 and are provided to the translation logic 504. The translation logic 504 translates/decodes each of the provided instructions into a corresponding sequence of micro instructions that direct the microprocessor 500 to perform the operations prescribed by the instructions. The extended translation logic 505 detects those instructions having an extended prefix tag according to the present invention and also provides for translation/decoding of corresponding write back specifier prefixes. In an x86 embodiment, the extended translation logic 505 is configured to detect an extended prefix tag of value F1H, which is the x86 ICE BKPT opcode. Micro instruction fields are provided in the micro instruction queue 506 to specify a condition under which an associated result is to be precluded from write back into its destination register.

The micro instructions are provided from the micro instruction queue 506 to the execution logic 507, wherein the extended execution logic 508 detects micro instructions having selective results write back features enabled as indicated by the micro instruction fields. The extended execution logic 508 performs the operation prescribed by the micro instructions and generates corresponding results. Following generation of the corresponding results, the extended execution logic 508 evaluates boundary conditions of the corresponding results and write back of the corresponding results is suppressed according to whether or not the condition indicated within the micro instruction fields is satisfied. In one embodiment, the condition is specified such that it is always true, thereby precluding an examination of condition codes prior to precluding write back of the result.

One skilled in the art will appreciate that the microprocessor 500 described with reference to FIG. 5 is a simplified representation of a present day pipeline microprocessor 500. In fact, a present day pipeline microprocessor 500 comprises upwards to 20-30 pipeline stages. However, these stages can be generally categorized into those three stage groups shown in the block diagram and thus, the block diagram 500 of FIG. 5 serves to teach the essential elements that are required to implement embodiments of the present invention as described hereinabove. Those elements of a microprocessor 500 which are extraneous to the present discussion, for clarity, are not depicted.

Turning now to FIG. 6, a block diagram is presented featuring one embodiment of an extended prefix 600 for selective control of results write back according to the present invention. The extended prefix 600 is an 8-bit prefix 600 and has a global results control (RC) field 602 comprising bit 0 and a spare field 601 comprising bits 7:1. Assertion of the RC field 602 and directs a conforming microprocessor to inhibit write back of an associated result regardless of the value of the result.

FIG. 7 is a block diagram of an alternative embodiment of an extended prefix 700 for selective control of results write back according to the present invention. The alternative extended prefix 700 has a parity code (PC) field 706, a zero code (ZC) field 705, a carry code (CC) field 704, a sign code (SC) field 703, an overflow code (OC) field 702, and a spare field 701. The code fields 702-706 correspond to typical result condition code flags that are found in many present day microprocessors. Assertion of any of these bits 702-706 directs a conforming microprocessor to inhibit write back of an associated result if corresponding flags in the microprocessor's condition code register are set following generation of the associated result.

FIG. 8 is a block diagram of another embodiment of an extended prefix 800 for selective control of results write back according to the present invention. This extended prefix 800 has a condition specifier field comprising bits 7:0. Therein, a condition is prescribed under which write back of the result is precluded if the condition proves true. In one embodiment, the specifier field 800 prescribes a logical combination of condition code flags. Alternatively, the field 800 prescribes another state of the microprocessor such as the state of an architectural register, interrupt status, and etc. If the specified condition is true following generation of the result, then write back of the result is suppressed.

FIG. 9 is a table 900 depicting exemplary conditions corresponding to the lower four bits of the condition specifier field 800 of FIG. 8. Accordingly, logical combinations of condition code states of a result are encoded as states of the lower four bits of the specifier 800. By encoding the specifier as shown in FIG. 9, inequality states can be configured such as greater than or equal (state 1101) and not above (state 0110). The table 900 depicts only exemplary states of the condition specifier 800 in order to teach the flexibility of the present invention, but is not provided to limit definition of any state or specifier 800 thereby.

Figure 10:
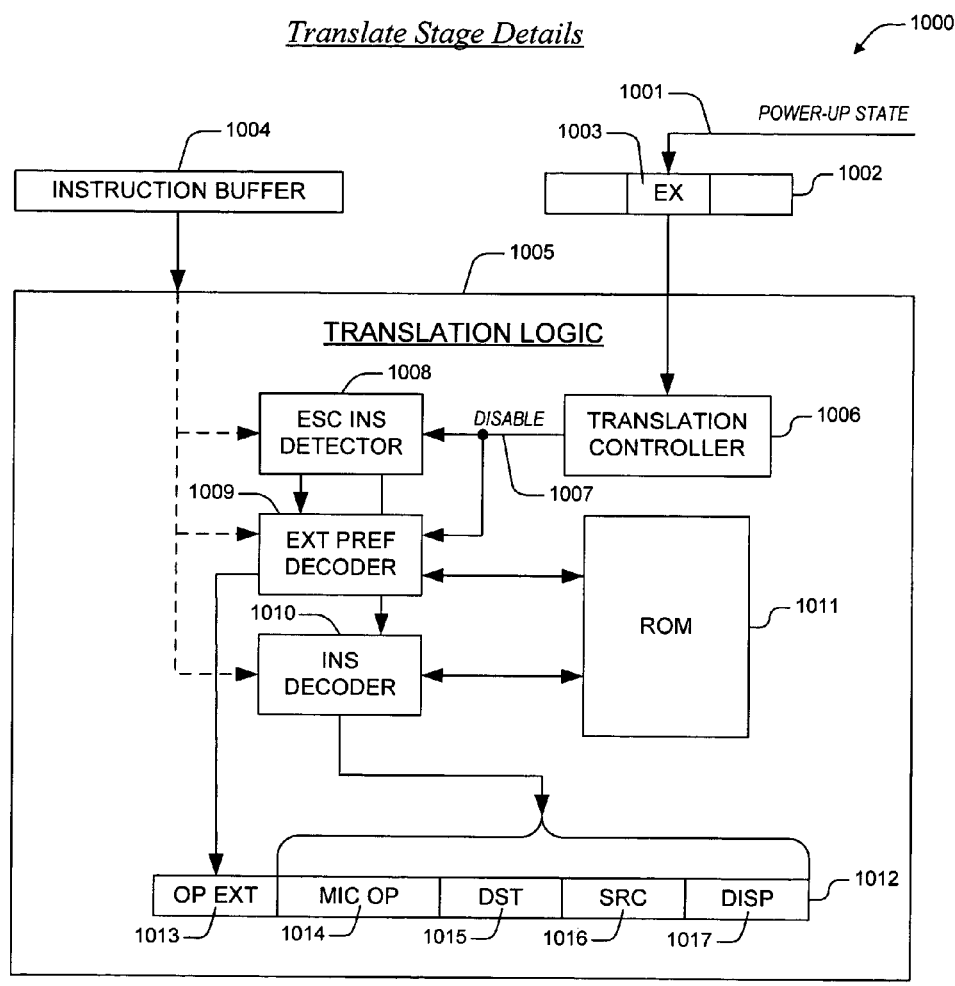
FIG. 10 is a block diagram featuring details of translate stage logic within the microprocessor of FIG. 5.

Turning now to FIG. 10, a block diagram is presented featuring details of translate stage logic 1000 within the microprocessor of FIG. 5. The translate stage logic 1000 has an instruction buffer 1004 that provides an extended instruction according to the present invention to translation logic 1005. The translation logic 1005 is coupled to a machine specific register 1002 that has an extended features field 1003. The translation logic 1005 has a translation controller 1006 that provides a disable signal 1007 to an escape instruction detector 1008 and an extended prefix decoder 1009. The escape instruction detector 1008 is coupled to the extended prefix decoder 1009 and an instruction decoder 1010. The extended prefix decoding logic 1009 and the instruction decoding logic 1010 access a control read-only memory (ROM) 1011, wherein are stored template micro instruction sequences that correspond to some of the extended instructions. The translation logic 1005 also has a micro instruction buffer 1012 having an opcode extension field 1013, a micro opcode field 1014, a destination field 1015, a source field 1016, and a displacement field 1017.

Operationally, during power-up of the microprocessor, the state of the extended field 1003 within the machine specific register 1002 is established via signal power-up state 1001 to indicate whether the particular microprocessor is capable of translating and executing extended instructions according to the present invention. In one embodiment, the signal 1001 is derived from a feature control register (not shown) that reads a fuse array (not shown) configured during fabrication of the part. The machine specific register 1002 provides the state of the extended features field 1003 to the translation controller 1006. The translation control logic 1006 controls whether or not instructions from the instruction buffer 1004 are translated according to extended selective results write back control translation rules or according to existing translation rules. Such a control feature is provided to allow supervisory applications (e.g., BIOS) to enable/disable extended execution features of the microprocessor. If extended features are disabled, then instructions having the opcode state selected as the extended features tag would be translated according to existing translation rules. In an x86 embodiment having opcode state F1H selected as the tag, an occurrence of F1H under conventional translation would result in an illegal instruction exception. Under extended translation rules, however, occurrence of the tag would be detected by the escape instruction detector 1008. The escape instruction detector 1008 would accordingly disable operation of the instruction decoder 1010 during translation/decode of a following extended write back specifier prefix by the extended prefix decoder 1009 and would enable the instruction decoder 1010 for translation/decode of the remaining parts of the extended instruction. Certain instructions would cause access to the control ROM 1011 to obtain corresponding micro instruction sequence templates. The opcode extension field 1013 of the micro instruction buffer 1012 is configured by the prefix decoder 1009 to prescribe a condition under which write back of a result of a corresponding operation is to be precluded. The remaining buffer fields 1014-1017 specify the corresponding operation and are configured by the instruction decoder 1010. Configured micro instructions 1012 are provided to a micro instruction queue (not shown) for subsequent execution by the processor.

Now referring to FIG. 11, a block diagram is presented illustrating extended execution logic 1100 within the microprocessor of FIG. 5. The extended execution logic 1100 has an arithmetic logic unit (ALU) 1109 that is coupled to a condition codes (or flags)register 1106 and a result buffer 1110. Two operands, OPERAND 1 and OPERAND 2, are retrieved from operand registers 1101, 1105 by the ALU 1109. A micro instruction register 1102 provides a micro instruction to the ALU 1109. The micro instruction register 1102 has an opcode extension field 1103 and a remaining field 1104. The micro instruction register 1102 is also coupled to a micro instruction buffer 1111. Contents of the result register 1110 and the micro instruction buffer 1111 are provided to write back logic 1112. The write back logic 1112 includes extended write back suppression logic 1113, which accesses the flags register 1106. The write back logic 1112 outputs results to registers in a register file (not shown) via bus 1114.

In operation, when an extended instruction employing selective results write back control features is translated into a micro instruction sequence according to the present invention, extended micro instructions are provided to the extended execution logic 1100 via the micro instruction register 1102 along with applicable operands in registers 1101 and 1105. The opcode extension field 1103 specifies a condition under which write back of a result is precluded, where the result corresponds to an operation prescribed by the remaining field 1104 using provided operands 1101, 1105. Accordingly, the ALU 1109 performs the prescribed operation and generates the result, which is provided to the result register 1110. The ALU 1109 also evaluates boundary conditions of the result updates all applicable condition flags in the flags register 1106. In synchronization with a pipeline clock signal (not shown), contents of the result register 1110 and the micro instruction buffer 1111 are piped to the write back logic 1112. Contents of the micro instruction buffer 1111 prescribe a destination register in the register file for write back of the result. The write back suppression logic 1113 accesses the condition flags register 1106 to determine whether or not the condition prescribed in the opcode extension field 1103 is true. If the condition is true, then write back of the contents of the result register 1110 is inhibited. If the condition proves false, then the write back suppression logic 1113 directs the write back logic 1112 to write back the result 1110 to its destination register in the register file via bus 1114.

Now referring to FIG. 12, a flow chart 1200 is presented depicting a method for translating and executing instructions according to the present invention that provide for selective control results write back. Flow begins at block 1202 wherein a program configured with extended instructions having programmable results write back features is provided to a microprocessor. Flow then proceeds to block 1204.

At block 1204, a next instruction is fetched from cache/memory. Flow then proceeds to decision block 1206.

At decision block 1206, the next instruction fetched in block 1204 is evaluated to determine whether or not it contains an extended escape tag/code. If not, then flow proceeds to block 1212. If the extended escape code is detected, then flow proceeds to block 1208.

At block 1208, because an extended escape tag has been detected in block 1206, translation/decoding is performed on an extended specifier prefix to determine a combination of condition codes which, if true, will preclude a generated result from being written back to its destination register. Flow then proceeds to block 1210.

At block 1210, corresponding fields of a micro instruction sequence are configured to indicate the combination of condition codes as prescribed by the extended prefix. Flow then proceeds to block 1212.

At block 1212, the remaining parts of the instruction (e.g., prefix entities, opcode, address specifiers) are translated/decoded to determine the operation to be performed along with associated operand attributes. Flow then proceeds to block 1214.

At block 1214, remaining fields of a micro instruction sequence are configured to prescribe the specified operation along with its operand specifications. Flow then proceeds to block 1216.

At block 1216, the micro instruction sequence, comprising the opcode extension field configured in block 1210 along with the remaining fields configured in block 1214, is provided to a micro instruction queue for execution by the microprocessor. Flow then proceeds to block 1218.

At block 1218, the micro instruction sequence is retrieved by extended execution logic according to the present invention. Flow then proceeds to block 1220.

At block 1220, the extended execution logic executes the prescribed operation and generates the result. Flow then proceeds to decision block 1222.

At decision block 1222, an evaluation occurs according to the combination of condition codes specified in the micro instruction sequence to determine if write back of the result is to be suppressed. If the combination of condition codes is true, then flow proceeds to block 1226. If the combination of condition codes is false, then flow proceeds to block 1224.

At block 1224, the result is written back to its associated destination register. Flow then proceeds to block 1226.

At block 1226, the method completes.

Although the present invention and its objects, features, and advantages have been described in detail, other embodiments are encompassed by the invention as well. For example, the present invention has been described in terms of a technique that employs a single, unused, opcode state within a completely full instruction set architecture as a tag to indicate that an extended feature prefix follows. But the scope of the present invention is not limited in any sense to full instruction set architectures, or unused instructions, or single tags. On the contrary the present invention comprehends instruction sets that are not entirely mapped, embodiments having used opcodes, and embodiments that employ more than one instruction tag. For example, consider an instruction set architecture where there are no unused opcode states. One embodiment of the present invention comprises selecting an opcode state that is presently used as the escape tag, where the selection criteria is determined according to market-driven factors. An alternative embodiment comprehends employing a peculiar combination of opcodes as the tag, say back-to-back occurrences of opcode state 7FH. The essential nature of the present invention thus embodies use of a tag sequence followed by an n-bit extension prefix that allows a programmer to preclude write back of a result corresponding to execution of an operation specified by remaining parts of an extended instruction, where write back of the result is conditioned upon satisfaction of a specified criterion.

In addition, the present invention has been exemplified by a microprocessor having a set of condition codes, or flags, that indicate boundary conditions of a generated result to include parity, overflow, sign, carry, and zero. And although these types of condition indicators prevail in use today, it is not the intention of the present invention to restrict application of the invention to only these types of conditions. For instance, alternative embodiments of the present invention comprehend alternatively specified conditions such as the state of contents of a particular register, whether or not a port or other I/O device is in use, the availability of memory or cache, and etc.

Furthermore, although a microprocessor setting has been employed to teach the present invention and its objects, features, and advantages, one skilled in the art will appreciate that its scope extends beyond the boundaries of microprocessor architecture to include all forms of programmable devices such as signal processors, industrial controllers, array processors, and the like.

Those skilled in the art should appreciate that they can readily use the disclosed conception and specific embodiments as a basis for designing or modifying other structures for carrying out the same purposes of the present invention, and that various changes, substitutions and alterations can be made herein without departing from the spirit and scope of the invention as defined by the appended claims.

What is claimed is:

1. A microprocessor apparatus, for selectively controlling write back of a result, comprising:
    translation logic, for translating an extended instruction into corresponding micro instructions, wherein said extended instruction comprises:
        an extended prefix, for precluding write back of the result, wherein the result is that which is produced by executing an operation prescribed by said extended instruction, and wherein the result would otherwise be written back into a destination register; and
        an extended prefix tag, for indicating said extended prefix, wherein said extended prefix tag is an otherwise architecturally specified opcode within an instruction set for a microprocessor; and
    extended execution logic, coupled to said translation logic, for receiving said corresponding micro instructions, and for executing said operation to generate the result, and for precluding write back of the result.

2. The microprocessor apparatus as recited in claim 1, wherein said extended instruction further comprises architecturally specified entities according to said instruction set.

3. The microprocessor apparatus as recited in claim 2, wherein said architecturally specified entities comprise:
    an opcode entity, for specifying said operation.

4. The microprocessor apparatus as recited in claim 1, wherein said extended prefix comprises a plurality of bits, and wherein each logic state of said plurality of bits prescribes a subset of a plurality of result conditions, wherein write back of the result is precluded if said subset is true.

5. The microprocessor apparatus as recited in claim 4, wherein said plurality of result conditions comprises overflow, carry, zero, sign, and parity.

6. The microprocessor apparatus as recited in claim 5, wherein said plurality of result conditions are maintained in a flags register in said microprocessor.

7. The microprocessor apparatus as recited in claim 1, wherein said extended prefix comprises 8 bits.

8. The microprocessor apparatus as recited in claim 1, wherein said instruction set comprises the x86 instruction set.

9. The microprocessor apparatus as recited in claim 8, wherein said extended prefix tag comprises opcode F1(ICE BKPT) in the x86 instruction set.

10. The microprocessor apparatus as recited in claim 1, wherein said corresponding micro instructions comprise a micro opcode field and a micro opcode extension field.

11. The microprocessor apparatus as recited in claim 10, wherein said extended execution logic employs said micro opcode extension field to determine conditions under which write back of the result is to be precluded, and wherein said extended execution logic employs said micro opcode field to determine said operation to be executed, thereby generating the result.

12. The microprocessor apparatus as recited in claim 11, where said extended execution logic comprises:
    write back suppression logic, configured to evaluate said conditions following generation of the result, and configured to preclude write back of the result if said conditions are true.

13. The microprocessor apparatus as recited in claim 1, wherein said translation logic comprises:
    escape instruction detection logic, for detecting said extended prefix tag; and
    extended prefix decoding logic, coupled to said escape instruction detection logic, for translating said extended prefix, and for configuring a micro opcode extension field within said corresponding micro instructions, said micro opcode extension field prescribing the conditions under which write back of the result is to be precluded.

14. The microprocessor apparatus as recited in claim 13, wherein said translation logic further comprises:
    instruction decoding logic, for configuring remaining fields within said corresponding micro instructions, said remaining fields specifying said operation according to said instruction set.

15. An extension mechanism, for adding result write back control features to an existing microprocessor instruction set, the extension mechanism comprising:
    an extended instruction, configured to direct a microprocessor to execute an operation, to generate a result of said operation, and to suppress write back of said result to a destination register, wherein said extended instruction comprises a selected opcode in the existing microprocessor instruction set followed by an n-bit extended prefix, said selected opcode indicating said extended instruction and said n-bit extended prefix indicating a condition under which write back is to be suppressed; and
    a translator, configured to receive said extended instruction, and configured to generate a micro instruction sequence directing said microprocessor to execute said operation, to generate said result, and directing a write back control logic to preclude write back of said result to said destination register if said condition is satisfied.

16. The extension mechanism as recited in claim 15, wherein said extended instruction further comprises:

extended instruction entities, configured to prescribe said operation.

17. The extension mechanism as recited in claim 16, wherein said extended instruction entities are configured according to the existing microprocessor instruction set.

18. The extension mechanism as recited in claim 15, wherein said condition is satisfied via execution of said operation.

19. The extension mechanism as recited in claim 15, wherein said condition comprises a logical combination of boundary conditions corresponding to said result, said boundary conditions comprising an overflow condition, a carry condition, a zero condition, a sign condition, and a parity condition.

20. The extension mechanism as recited in claim 15, wherein said n-bit extended prefix comprises 8 bits.

21. The extension mechanism as recited in claim 15, wherein the existing microprocessor instruction set is the x86 microprocessor instruction set.

22. The extension mechanism as recited in claim 21, wherein said selected opcode comprises opcode ICE BKPT (i.e., opcode F1) in the x86 microprocessor instruction set.

23. The extension mechanism as recited in claim 15, wherein said translator comprises:
    an escape instruction detector, for detecting said selected opcode within said extended instruction; and
    an extended prefix decoder, coupled to said escape instruction detector, for translating said n-bit extended prefix, and for generating a micro opcode extension field within said sequence of micro instructions that prescribes said condition.

24. An instruction set extension apparatus, for providing programmable result write back capabilities to an existing microprocessor instruction set, the instruction set extension apparatus comprising:
    an escape tag, for reception by a translation logic, and for indicating that accompanying parts of a corresponding instruction prescribe an extended operation to be performed by a microprocessor to generate a result that would otherwise be written back to a destination register, wherein said escape tag is a first opcode entity within the existing microprocessor instruction set;
    a write back specifier, coupled to said escape tag and being one of said accompanying parts, for prescribing a condition associated with said result of said extended operation; and
    a write back controller, coupled to said translation logic, for evaluating said condition, and, if said condition is true, for disabling write back of said result to said destination register.

25. The instruction set extension apparatus as recited in claim 24, wherein the remainder of said accompanying parts comprise a second opcode entity and an optional plurality of address specifier entities.

26. The instruction set extension apparatus as recited in claim 24, wherein said write back specifier comprises an 8-bit data entity.

27. The instruction set extension apparatus as recited in claim 24, wherein the existing microprocessor instruction set is the x86 microprocessor instruction set.

28. The instruction set extension apparatus as recited in claim 27, wherein said first opcode entity comprises the ICE BKPT opcode entity (i.e., opcode F1) in the x86 microprocessor instruction set.

29. The instruction set extension apparatus as recited in claim 24, wherein said translation logic translates said escape tag and said accompanying parts into corresponding micro instructions that direct extended execution logic to perform said extended operation.

30. The instruction set extension apparatus as recited in claim 24, wherein said translation logic comprises:
    escape tag detection logic, for detecting said escape tag, and for directing that said accompanying parts be translated according to extended translation conventions; and
    decoding logic, coupled to said escape tag detection logic, for performing translation of microprocessor instructions according to conventions of the existing microprocessor instruction set, and for performing translation of said corresponding instruction according to said extended translation conventions to allow programmable write back of said result.

31. The instruction set extension apparatus as recited in claim 24, wherein said write back specifier prescribes said condition such that said condition is true regardless of condition codes corresponding to said result.

32. A method for extending a microprocessor instruction set to provide for programmable write back of a result of a prescribed operation, the method comprising:
    providing an extended instruction, the extended instruction including an extended tag along with an extended prefix, wherein the extended tag is a first opcode in the microprocessor instruction set;
    prescribing, via the extended prefix and remaining parts of the extended instruction, the prescribed operation, wherein the result is otherwise written back into a destination register, and wherein said prescribing directs that write back of the result be inhibited; and
    executing the prescribed operation, generating the result, and inhibiting write back of the result into the destination register.

33. The method as recited in claim 32, wherein said prescribing comprises:
    first specifying the prescribed operation, wherein said first specifying comprises employing a second opcode in the microprocessor instruction set.

34. The method as recited in claim 32, wherein said providing comprises employing an 8-bit entity to configure the extended prefix.

35. The method as recited in claim 32, wherein said providing comprises selecting the first opcode from the x86 microprocessor instruction set.

36. The method as recited in claim 35, wherein said selecting comprises choosing the x86 ICE BKPT opcode (i.e., opcode F1) as the extended tag.

37. The method as recited in claim 32, further comprising:
    translating the extended instruction into micro instructions that direct extended execution logic to inhibit write back of the result following said executing.

38. The method as recited in claim 37, wherein said translating comprises:
    within translation logic, detecting the extended tag; and
    decoding the extended prefix and the remaining parts of the extended instruction according to extended translation rules, the extended translation rules providing programmable result write back capabilities to an existing microprocessor architecture which are not provided according to conventional translation rules.

* * * * *